United States Patent [19]

Tarr

[11] 4,109,259
[45] Aug. 22, 1978

[54] EXPOSURE PREVENTING SHADE

[75] Inventor: Fred P. Tarr, Lexington, Mass.

[73] Assignee: Polaroid Corporation, Cambridge, Mass.

[21] Appl. No.: 810,935

[22] Filed: Jun. 29, 1977

[51] Int. Cl.² .............................................. G03B 17/50
[52] U.S. Cl. ..................................... 354/86; 354/154; 354/210
[58] Field of Search ................. 354/154, 157, 158, 86, 354/83, 85, 236, 210

[56] References Cited

U.S. PATENT DOCUMENTS 3,608,456  9/1971  Hauser ............................ 354/154 X Primary Examiner—John Gonzales
Attorney, Agent, or Firm—Alfred E. Corrigan

[57] ABSTRACT

A reflex camera having a film chamber for supporting a film cassette having a film unit therein in position for exposure and a motor driven spread roller assembly mounted in position to receive an exposed film unit therebetween as it is being advanced from the film cassette and spread a processing fluid across an element of the film unit to initiate the formation of a visible image therein. During viewing of the subject through the camera's objective, an opaque shade or curtain having an exposure aperture therein is mounted between the objective and the film unit with the exposure aperture located out of alignment with the exposure aperture in the film cassette thereby preventing inadvertent exposure of the film unit during the viewing operation. Subsequent to depressing an exposure initiating button, the shade is partially wound upon a first roller while simultaneously being unwound from a second roller to bring the exposure aperture in the shade into alignment with the exposure aperture in the film cassette in preparation for exposure of the film unit. The second roller is provided with a gear which is adapted to move in and out of mesh with a gear on one of the spread rollers. After the film unit has been exposed, the motor is energized to drive the spread roller having the gear thereon which in turn, due to its mesh with the gear on the second roller, rotates the latter to wind the shade upon the second roller while simultaneously unwinding it from the first roller thereby moving the exposure aperture in the shade out of alignment with the exposure aperture in the film cassette. A solenoid is provided for moving the gear on the second roller out of mesh with the gear on the spread roller to allow the shade to be again wound upon the first roller in preparation for the exposure of the next film unit.

4 Claims, 7 Drawing Figures

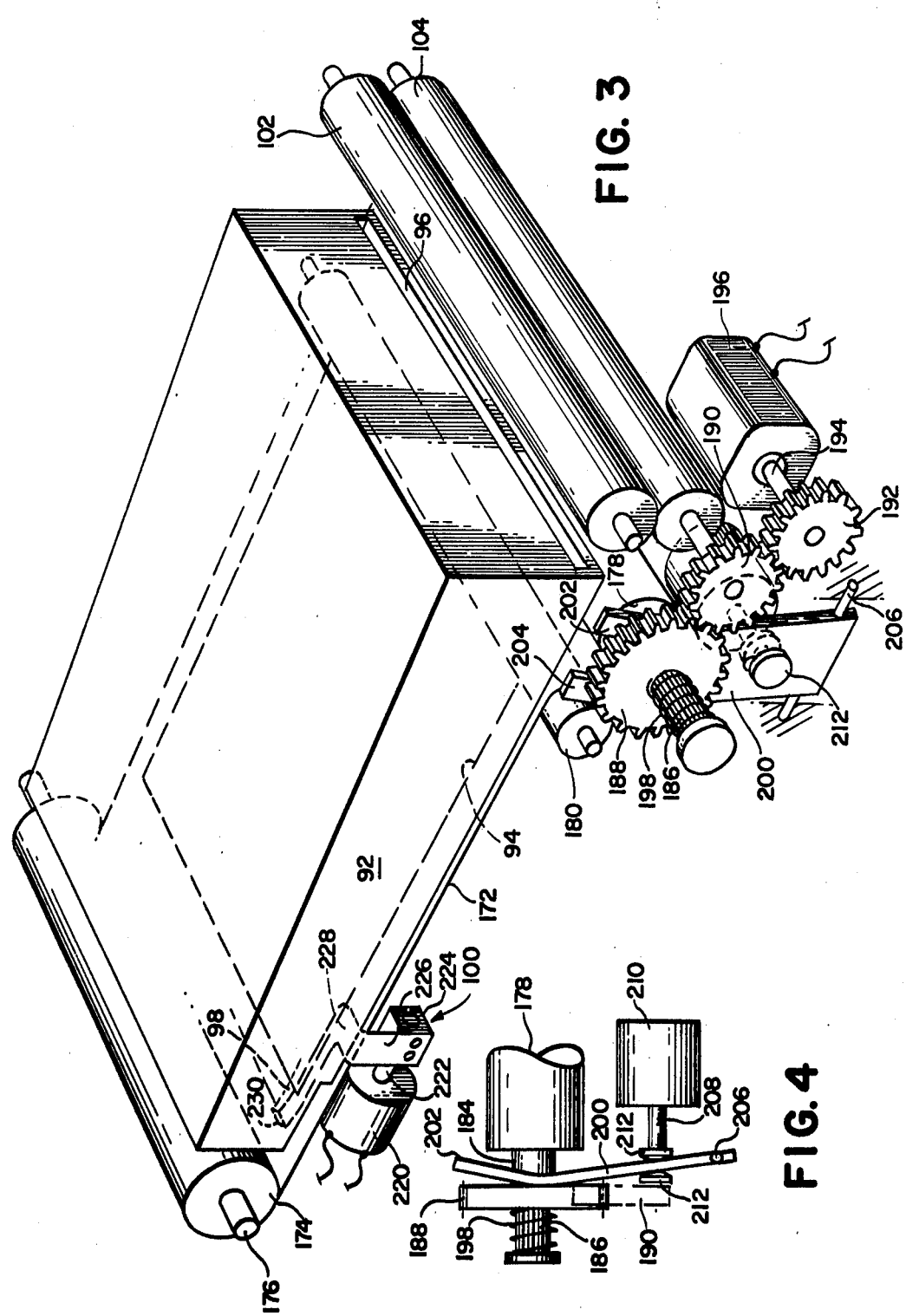

4,109,259

EXPOSURE PREVENTING SHADE

RELATED APPLICATION

This application is related to my copending application Ser. No. 811,082 entitled "Camera Having Dual Film Capacity", filed on even date herewith.

BACKGROUND OF THE INVENTION

1. Field of the Invention

This invention relates to reflex cameras having light shades for preventing inadvertent exposrue of a film unit during viewing of the subject to be photographed.

2. Description of the Prior Art

Cameras of the reflex type are well known and generally include a pivotally mounted reflecting mirror which is used during the viewing and/or focusing of the subject to be photographed and a curtain or plate which may be moved betwen a light blocking position wherein it prevents inadvertent exposure of a film unit during the viewing and or focusing operation and a non-blocking position in which the film unit may be exposed. For example, see U.S. Pat. Nos. 3,165,042 and 3,714,879 which show a plate type light blocking member and U.S. Pat. No. 3,411,422 which shows a curtain. One of the problems with reflex cameras of the type having a pivotally mounted plate is that they usually entail complicated and expensive operating mechanisms to pivot the plate between its light blocking and unblocking positions. Also, considerable space must be provided in the camera to allow for pivoting movement of the plate. On the other hand, reflex cameras of the type having a curtain or shade for providing the light blocking function generally require that tensioning of the curtain for subsequent movement from its light blocking position to its unblocking position be accomplished by an act which is independent of th act of depressing a button to initiate an exposure cycle, e.g., winding of a film transport lever to move a film unit into its exposure position.

SUMMARY OF THE INVENTION

The instant invention relates to a reflex camera of the instant or self-developing type. The camera include a film chamber in which a film cassette having an exposure aperture and a film withdrawal slot is adapted to be positioned so as to locate a film unit contained with the film cassette in position for exposure. A pair of elongate rollers are mounted adjacent one end of the film chamber in position to receive a film unit therebetween as it is being advanced from the film cassette following exposure. The rollers are adapted to rupture a container of processing fluid associated with each film unit and spread the fluid across an element of the film unit to initiate the formation of a visible image therein while simultaneously moving the film unit away from its exposure position.

A light blocking apparatus is mounted closely adjacent to the film chamber. The light blocking apparatus includes first and second rollers mounted adjacent opposite ends of the film chamber and an opaque curtain or shade having an exposure aperture therein which is of substantially the same size as the film cassette's exposure aperture. The shade has its opposite ends attached to the two rollers. The first roller is adapted to be driven by a spring for winding a portion of the opaque shade thereon and the second roller is driven via a gear which is in mesh with a motor driven gear train. The gear train is also connected to at least one of the spread rollers for driving it.

During the viewing and/or focusing operation of the reflex camera, the opaque shade assumes a first position wherein it prevents the film unit from being inadvertently exposed. After the subject has been viewed and the camera's exposure button has been actuated to initiate an exposure cycle, the gear on the second roller is momentarily moved out of mesh with the motor driven gear train thereby enabling the first roller, under the force of its pretensioned spring, to reposition the opaque shade such that its exposure aperture is in alignment with the exposure aperture in the film cassette. After the camera's shutter has been actuated to expose the film unit, the camera's film advancing apparatus and its motor are energized to move the exposed film unit into the bite of the driven spread roller assembly. Simultaneous therewith the second roller, which is now back in mesh with the gear train, winds a portion of the opaque shade onto itself while unwinding it from the first roller. This winding continues until the exposure aperture in the opaque shade is out of alignment with the exposure aperture in the film cassette. At this time the film unit has moved out of engagement with the spread rollers and the camera's motor shut off. Alternatively, a one way clutch could be provided between the second roller and the gear train to disconnect the two after the second roller had been rotated through a predetermined number of revolutions.

An object of the invention is to provide a reflex camera of the self-developing or instant type with an opaque shade having an exposure aperture therein which is moved by the camera's spread roller assembly from a light unblocking position relative to a film unit located in position for exposure to a light blocking position in preparation for the viewing of the next subject to be photographed.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 3 is an enlarged perspective view of a film cassette adapted for use with the camera of FIG. 1 and components of the camera relating to the exposure and processing of a film unit;

FIG. 4 is an end view of a portion of FIG. 3;

DETAILED DESCRIPTION OF THE INVENTION

Figure 1:
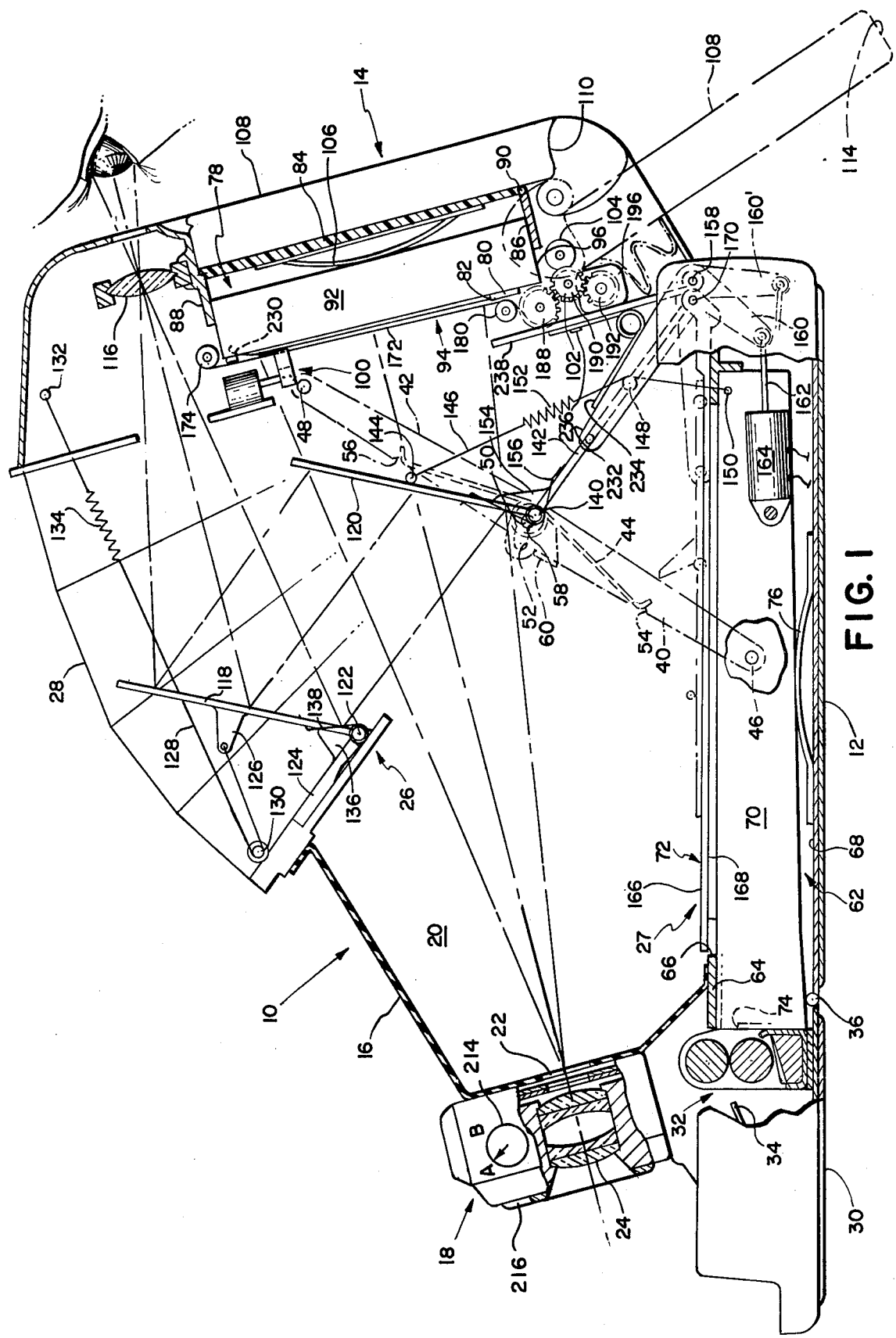
FIG. 1 is an elevational view, partly in section, showing a collapsible self-developing type camera having provision for simultaneously receiving two different types of film.
Figure 2:
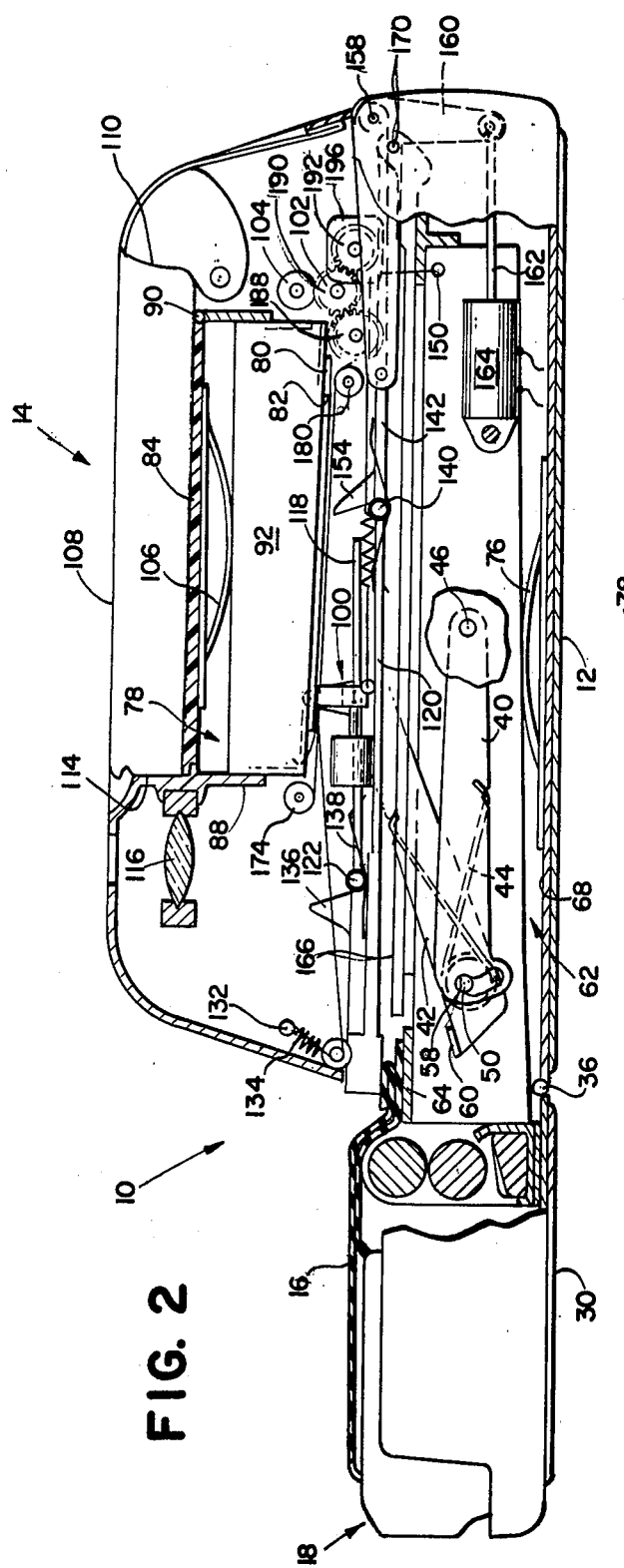
FIG. 2 is an elevational view, partly in section, of the camera shown in FIG. 1 in its collapsed position.

Reference is now made to FIG. 1 of the drawings wherein is shown a camera 10 of the type adapted to receive two film cassettes containing film units of different types, e.g., one cassette may contain film units of the type which are adapted to be exposed and viewed from the same side (see U.S. Pat. No. 3,415,644) while the other cassette may contain film units of the type which are adapted to be exposed through one side and viewed through the opposite side (see U.S. Pat. No. 3,594,165). The camera 10 includes a plurality of housing sections 12, 14, 16 and 18 pivotally coupled to each other for movement between an erect operative position, as shown in FIG. 1, and a collapsed inoperative position, as shown in FIG. 2. The space between the housing sections 12, 16 and 18 is enclosed by a bellows 20 having an opening 22 adjacent the camera's lens and shutter assembly 24, an oppositely positioned opening 26 and an adjacent opening 27. The space between the open end 26 and the housing section 14 is enclosed by a bellows 28. Extending forwardly of the housing section 12 is a spread roller housing section 30 which carries a pair of pressure-applying rollers 32 and a deflecting plate 34. The spread roller housing section is pivotally coupled at 36 to the housing section 12 for counterclockwise movement from its operative position shown in FIG. 1 to a position wherein a film cassette may be inserted into the housing section 12. Basically, the camera portion defined by the housing sections 12, 16, 18 and 30 and the bellows 20 is the same as that disclosed in U.S. Pat. No. 3,709,122.

The various housing sections of the camera are maintained in the erected operative position by an erecting link 38 comprised of legs 40 and 42 and a spring 44. The leg 40 is pivotally coupled at 46 to the housing section 12 while the leg 42 is pivotally coupled at 48 to the housing section 14. The legs 40 and 42 are in turn pivotally coupled to each other by a pin 50, carried by the leg 42, which rides in a slot 52 in the leg 40. The spring 44 encircles the pin 50 and has its opposite ends suitable received in notches 54 and 56 in legs 40 and 42, respectively, for biasing the legs 40 and 42 into the position shown in FIG. 1. As the legs 40 and 42 pivot into the position shown in FIG. 1, the pin 50 carries the encircled portion of the spring 44 over center and then drops into a recess 58 at the same time that a flange 60 on the leg 42 abuts an edge of th leg 40. The various housing sections are moved into their collapsed positions by rotating the leg 40 in a counterclockwise direction until the pin 50 moves the encircled portion of the spring 44 over center at which point the user now applies a force to the housing section 14 to rotate it in a counterclockwise manner into the position shown in FIG. 2 wherein it is releasably maintained by suitable means (not shown).

The housing section 12 includes a chamber 62 defined in part by a partition 64, to which a portion of the bellows 20 is secured, having an exposure aperture 66 therein and a bottom wall 68. The chamber 62 is adapted to receive and support a film cassette 70 in position for exposure of a film unit contained therein. The cassette 70 includes an exposure aperture 72, an exit slot 74 in the leading end wall through which the film unit may be moved, subsequent to exposure, and a slot (not shown) formed in the cassette's forward and trailing end walls (to the right in FIG. 1) through which suitable means, such as the film advancing means shown in the aforementioned U.S. Pat. No. 3,709,122, may extend so as to engage the forwardmost film unit and advance it into the bite of the rollers 32 via slot 74. Suitable means such as resilient members 76 (only one being shown) may be provided for urging the forward wall of the cassette into engagement with the partition 64 so as to locate the forwardmost film unit in the cassette in position to be moved into the focal plane after the cassette's dark slide has been removed.

The second section 14 includes a chamber 78 defined in part by a partition 80 having an exposure aperture 82 therein, a loading door 84 and end walls 86 and 88. The loading door 84 is pivotally coupled to the end wall 86 at 90 for movement in a clockwise direction from its closed position to its open position wherein a film cassette 92 may be inserted in the chamber 78. The cassette includes a forward wall having an exposure aperture 94 therein, a slot 96 in a leading end wall through which a film unit may be removed from the cassette subsequent to exposure and a slot 98 (see FIG. 3) through which film advancing means 100 are adapted to extend so as to engage the trailing edge of th forwardmost film unit in the cassette and advance the film unit through the slot 96 and into engagement with a pair of spread rollers 102 and 104. Suitable means such as resilient members 106 (only one being shown) attached to the loading door 84 may be provided for urging the forward wall of the cassette 92 against the partition 80 when the cassette is secured within the chamber 78. Mounted adjacent to and in overlying relation to the loading door 84 is an imbibition chamber 108 having an open end 110. The imbibition chamber 108 is pivotally coupled to the housing section 14 for movement between its stored position, as shown in solid lines in FIG. 1, to its operative position, as shown in broken line, wherein its open end 110 is located in lighttight relation with the exit side of the spread rollers 102 and 104 and in position to receive a film unit as it emerges from the rollers 102 and 104. The imbibition chamber may be formed from any suitable light attenuating material which will insure that any light which enters the chamber while it is in its operative position will be at a level which will not adversely affect the formation of the developed image. For example, the attenuation of the light for the film unit described in the aforementioned U.S. Pat. No. 3,396,647 should be much greater than that for the film unit described in said U.S. Pat. No. 3,594,165. The imbibition chamber is preferably formed with a normally closed slit (not shown) in wall 114 through which the exposed film unit may be withdrawn from the chamber. Obviously, if the film unit passing through the rollers 102 and 104 is of the type that no longer needs to be protected from the ambient light outside of the camera then the user of the camera may use the imbibition chamber as a film holder or alternatively, fold the imbibition chamber into its inoperative position and allow the film unit to come directly into the light.

As mentioned hereinbefore, the camera 10 includes a single lens reflex viewing system. The system includes a viewing lens 116, a pair of mirrors 118 and 120 and of course the camera's objective in the shutter and lens assembly 24. The image bearing light rays pass through the normally open lens and shutter assembly 24 and toward the mirror 120 where they are reflected onto the mirror 118 which in turn direct them through the viewing lens 116.

Each of the mirrors 118 and 120 is mounted for automatic movement between its operative extended position, as shown in solid lines in FIG. 1, and its inoperative collapsed position, as shown in broken lines in FIG. 1 and in solid lines in FIG. 2. Specifically, one end of the mirror 118 is pivotally mounted at 122 to a plate 124. A post 126 is secured to the back side of the mirror 118 and is adapted to anchor one end of a cable 128. The cable 128 extends from its attachment point to the post 126 to a pulley 130 mounted on the plate 124. The cable wraps around the pulley 130 and has its terminal end secured at 132 to the housing section 14. The cable 128 is provided with a resilient section 134 intermediate its ends for insuring that the cable is taut when the mirror abuts against its stop 136. A spring 138 is provided for biasing the mirror 118 in a clockwise manner into the same plane as the plate 124 whereat further clockwise rotation is prevented by suitable stop means (not shown).

In a similar manner, one end of the mirror 120 is pivotally mounted at 140 to a plate 142. A post 144 is mounted on the back side of the mirror 120 for receiving one end of a cable 146. The cable 146 extends from the post 144 around a pulley 148 mounted on the plate 142 and then is secured at 150 to the housing secton 12. The cable 146 is provided with a resilient section 152 intermediate its ends for insuring that the cable is taut when the mirror 120 abuts against its stop 154. A spring 156 is provided for biasing the mirror 120 in a counterclockwise direction into a plane containing the plate 142 whereat further counterclockwise rotation of the mirror 120 about pivot 140 is prevented by suitable means (not shown).

The plate 142 is pivotally coupled at 158 to the interior framework of the camera. A link 160 has one of its ends secured to the plate 142 and its other end pivotally coupled to an arm 162 of a solenoid 164. When the solenoid 164 is energized, the arm 162 moves to the right against an internal spring bias to move the link 160 to the position indicated by 160' thereby rotating the plate 142 and the mirror 120 in a counterclockwise direction into the position shown in broken lines. As the plate 142 and the mirror 120 are rotated toward the broken line position, the pulley 148 gradually moves closer to the point 150 at which one end of the cable 146 is secured thereby gradually decreasing the tautness in the cable. As the tautness lessens in the cable 146 the spring 156 progressively picks up any slack in the cable as it rotates the mirror in a counterclockwise direction about the pivot 140 until it lies in the same plane as the plate 142. The converse is true when the plate 142 and the mirror 120 are moved into their solid line positions, i.e., the mirror 120 stays in the same plane as the plate 142 until the pulley has been rotated into a position wherein it applies a force to the cable 146 which opposes the force of the spring 146. Further rotation of the pulley about the pivot 156 gradually increases the tautness of the cable 146 while simultaneously pivoting the mirror 120 about its pivot 140 until it engages its stop 154.

Each of the housing sections 12 and 14 is provided with means for preventing the inadvertent exposure of a film unit during the viewing and focusing operation. In the case of the housing section 12 these means take the form of a cover 166 having a mirror 168 on one side thereof. The cover 166 is pivotally mounted at 170 to the camera's internal structure for movement between a first position wherein it overlies the film cassette 70 and precludes light from the lens and shutter assembly 24 from exposing the foremost film unit in the cassette and a second erected position wherein it lies closely adjacent to the erected plate 142 such that its mirrored side 168 is in position to reflect image bearing light onto the foremost film unit in the cassette 70 when the film unit has been selected for exposure. For reasons of clarity, the mechanism for pivoting the cover 166, removing the exposed film unit from the cassette 70 and driving the roller assembly 32 has not been shown but may take any suitable form such as that shown in the aforementioned U.S. Pat. No. 3,709,122.

The housing section 14 is provited with a shade or light shield 172 formed from any suitable opaque material for preventing inadvertent exposure of the foremost film unit in the cassette 92. The shade 172, which has a width substantially equal to that of the film cassette 92, has one of its ends secured to a roller 174 which in turn is rotatably mounted upon a fixed shaft 176 and its other end secured to a roller 178. An idler roller 180 is mounted intermediate the rollers 174 and 178 so as to change the direction that the shade 172 is wound upon the roller 178 and to keep the shade 172 in close proximity to the exposure aperture 94 in the film cassette 92. The shade is provided with an exposure aperture 182 which is coextensive with the exposure aperture 94 in the film cassette.

Figure 5:
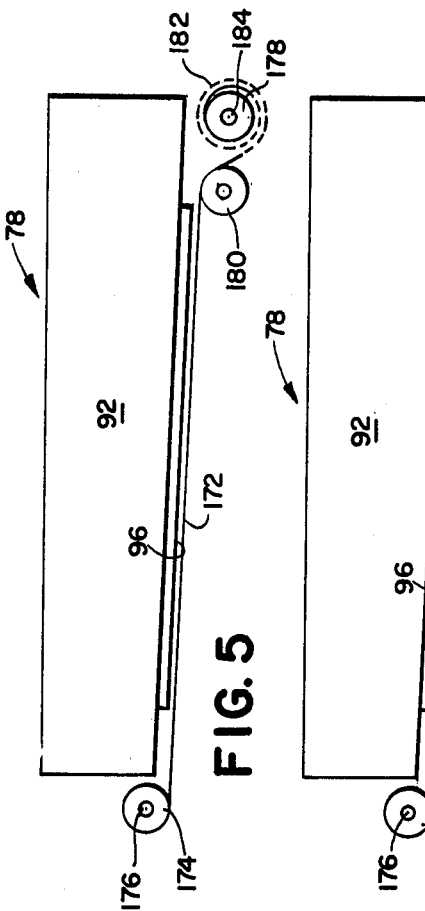
FIG. 5 is a schematic representation of an opaque shade shown in its light blocking position relative to the exposure aperture of a film cassette.
Figure 6:
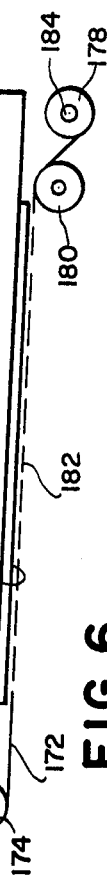
FIG. 6 is a view similar to FIG. 5 showing an aperture in the opaque shade located in alignment with the exposure aperture in the film cassette.

The roller 178 is fixedly secured to a shaft 184 which in turn is suitably supported for rotation about its longitudinal axis. One end of the shaft 184 is splined at 186 so as to slidably receive a correspondingly splined gear 188. The gear 188, the shaft 184 and the roller 178 are adapted to be driven in a counterclockwise direction by a gear 190 mounted on one end of the spread roller 104 which in turn is driven by a gear 192 which is fixedly attached to the shaft 194 of a motor 196. The gear 188 is maintained in mesh with the gear 190 by a coil spring 198 which encircles the splined portion 186 of the shaft 184. However, means are provided for moving the gear 188 out of mesh with the gear 190 when it is desired that the exposure aperture 182 in the shade 172 should be moved into alignment with the exposure aperture 96 in the cassette 92, as shown in FIG. 6. Specifically, these means comprise a bifurcated member 200 the arm 202 and 204 of which straddle the shaft 184 (see FIG. 4). The lower end of the member 200 is pivotally connected at 206 to the camera's internal structure. Also, the lower end of the member is provided with an aperture for receiving the movable arm 208 of a solenoid 210. Suitable means such as lock washers 212 may be provided on the arm 208 for securing it to the member 200. As is readily apparent from viewing FIG. 4, the arm 208 moves to the left when the solenoid 210 is energized thereby rotating the bifurcated member 200 in a counterclockwise direction about its pivot 206. This action results in the arms 202 and 204 sliding the gear 188 along the splines 186 until it is out of mesh with the gear 190. At this point the gear 188, the shaft 184 and the roller 178 are free to rotate about the axis of the shaft 184. At this point it should be noted that when the shade 172 was substantially unwound from the roller 174 and simultaneously wound upon the roller 178, as depicted in FIG. 5, a coil spring (not shown) having one of its ends secured to the shaft 176 and its other end secured to the roller 174 was wound up or charged so as to bias the roller for rotation in a clockwise manner.

However, the charged force of this coil spring, as transmitted to the roller 178 via the shade 172, is not sufficient to unwind the shade 172 from the roller 178 as long as the gears 188 and 190 are in mesh because of the resistance of the rollers 102 and 104 and the motor 196. Once the gear 188 moves out of mesh with the gear 190, the coil spring associated with the roller 174 rotates the latter in a clockwise direction thereby winding a portion of the shade onto the roller 174 while simultaneously unwinding the shade 172 from the roller 178 until the exposure aperture 182 in the shade is located in alignment with the exposure aperture 96 in the film cassette 92.

Mounted on one side of the housing section 18 is a film selector 214 the dial of which may be rotated to either the letter "A", which indicates that the film unit located in the housing section 12 has been selected for exposure, or to the letter "B", which indicates that the film unit located in the housing section 14 has been selected for exposure. The camera is also provided with two electrical circuits, one for controlling the exposure cycle of the film unit in the housing section 12 and the other for controlling the exposure cycle of the film unit located in the housing section in the housing section 14.

The various components of the camera are in the positions shown in FIG. 1 when the camera is in its extended operative position. When the operator of the camera selects which of the two types of film he wishes to expose, he connects the appropriate electrical circuit with a source of electrical energy, e.g., a battery which may be located in the related film cassette or with a battery which is mounted within a battery compartment within the camera. After selecting the type of film to be exposed, the operator views the image of the subject which has been directed to the lens 116 by the normally open lens and shutter assembly and the mirrors 120 and 118. The subject is then brought into focus and an exposure initiating button 216 is depressed to start an exposure cycle. Assuming the film selector has been dialed to the letter "A", depression of the button 216 causes the closing of the shutter and lens assembly 24. As soon as the shutter has been closed, the cover 166 is pivoted about 170 in a clockwise direction until it reaches its erected position closely adjacent to the plate 142 wherein its mirrored surface 168 is now facing the lens and shutter assembly 24. The shutter is now opened, the exposure interval timed by the camers's exposure control circuit, and the exposure is terminated by closing the shutter. During the exposure, the image bearing light has been directed onto the mirrored surface 168 by the lens. The surface 168 in turn reflects the light through the exposure aperture 72 in the film cassette 70 and onto the foremost film unit contained therein. The cover 166 is then returned to its original position shown in FIG. 1 and the camera's film advancing apparatus (not shown) and the roller assembly 32 are then temporarily driven to move the exposed film unit out of the film cassette 70 via opening 74, through the rotating rollers of the roller assembly 32 which spread a processing fluid across the exposed photosensitive element of the film unit, and against the deflecting plate 34 which directs the film unit to the exterior of the camera, all as is well known in the art. The shutter is then opened to permit viewing of the subject again.

When the film selector has been dialed to the letter "B", depression of the button 216 starts an exposure cycle by causing the shutter and lens assembly 24 to close. The solenoid 164 is then energized to pivot the plate 142 and the mirror 120 from their solid line position in FIG. 1 to their broken line position. Simultaneously therewith, or shortly thereafter, the viewfinder is closed and the solenoid 210 is energized to move the gear 188 out of mesh with the gear 190 thereby allowing the roller 174 to rotate in a clockwise direction under the force of its coil spring. This rotation of the roller 174 results in the exposure aperture 182 in the shade 172 being unwound from the roller 178 and driven to the position shown in FIG. 6 wherein it is located in alignment with the exposure aperture 96 in the cassette 92. The shutter is then opened, the exposure interval timed and the exposure terminated by closing the shutter. After the shutter has been closed, the solenoid 210 is deenergized thereby allowing the spring 198 to move the gear 188 back into mesh with the gear 190. The motor 196 is then temporarily energized to drive the spread roller 104 and rewind the exposure aperture 182 in the shade 172 back onto the roller 178 thereby progressively covering the exposed film unit with the opaque portion of the shade 172 while simultaneously charging or rewinding the coil spring of the roller 174, as described hereinbefore. At the same time that the motor 196 is energized, the film advancing means 100 is energized or pulsed to move its arm 222 to the right and back to its original position. The arm 222 carries a block 224 to which one end of a resilient strip of metal 226 is attached. The strip 226 includes a portion 228 which extends between the shade 172 and the film cassette 92 and terminates in an upwardly turned pick or film engaging portion 230 which is adapted to engage the trailing edge of the foremost film unit in the cassette 92. When the arm is momentarily moved to the right, as viewed in FIG. 3, the pick 230 engages the edge of the foremost or exposed film unit and advances its opposite edge through the exit slot 96 and into the bite of the rotating rollers 102 and 104. The rollers 102 and 104 rupture a pod of processing fluid carried by the film unit and spread its contents across the photosensitive layer of the film unit to initiate the formation of a visible image within the film unit. The film unit is then deposited into the imbibition chamber 108 or directed to the exterior of the camera. The motor 196 is then deenergized, as is the soldnoid 164 thereby allowing the arm 162 under its spring bias to return the plate 142 and the mirror 120 to the raised solid line position shown in FIG. 1 and the viewfinder and shutter opened to permit viewing for the next exposure.

After the last exposure has been made, the camera may be folded or collapsed by applying a force to the erecting link 38 which will move the pin 50 out of the recess 58 in the slot 52 and past its dead center position. The operator of the camera then maintains a steady downwardly directed force on the housing section 14 to cause it to rotate in a counterclockwise direction about the pivot 158. This movement of the housing section 14 is translated to the mirrors 118 and 120 to automatically move them from their erected positions to their non-viewing positions as the camera is being collapsed. Specifically, as the housing section 14 is rotated as described, the attachment point 132 for the cable 128 moves toward the pulley 130 thereby introducing slack into the cable 128 which is immediately taken up by the spring 138 pivoting the mirror 118 in a clockwise direction. At substantially the same time that the mirror 118 started to move into its non-viewing position, the mirror 120 started to move into its non-viewing positions wherein it would lie beneath the mirror 118. As can be seen in FIG. 1, the above-described movement of the housing section 14 is translated to a flange 232 on the plate 142 by a spring 234. The spring 234 has one of its arms fixedly secured at 236 to a flange 238 of the housing section 14 while its other arm is merely positioned in engagement with the flange 232. As the plate 142 is rotated in a counterclockwise direction, the pulley 148 moves closer to the attachment point 150 of the cable 146 thereby progressively decreasing the force which it applies against the cable 146. As previously described, this action permits the spring 156 to pivot the mirror 120 into a plane containing the plate 142. Finally, when the housing section 14 is located in superposed relation to the housing section 12, as shown in FIG. 2, the two housing sections are latched together by any suitable means.

Figure 7:
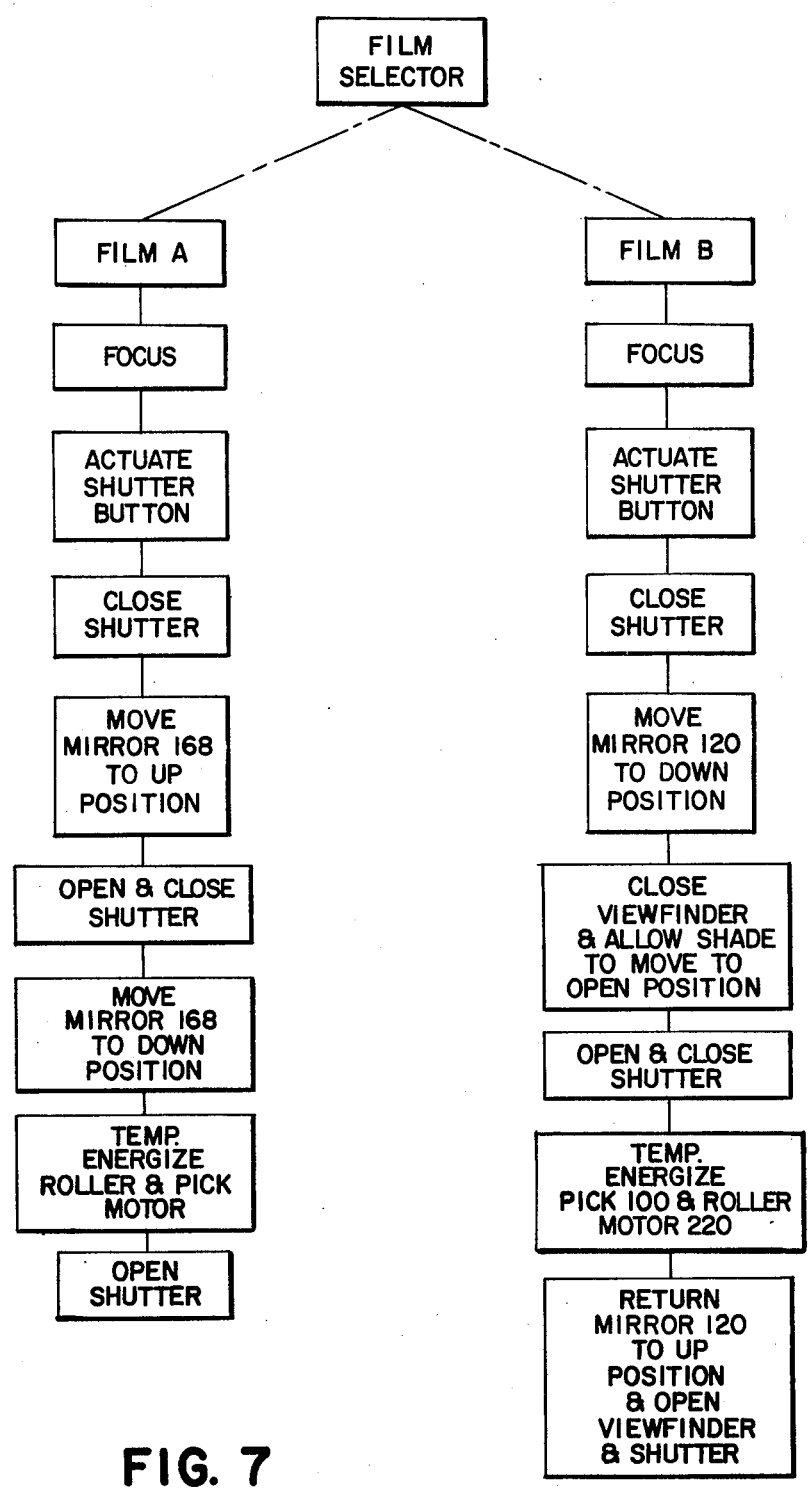
FIG. 7 is a flow chart showing the various steps which are carried out in accordance with the type of film selected to be exposed.

Since certain changes may be made in the above apparatus without departing from the scope of the invention herein involved, it is intended that all matter contained in the above-described description and shown in the accompanying drawings shall be interpreted as illustrative and not in a limiting sense. For example, while FIG. 7 depicts the preferred order of steps in each exposure cycle it should be obvious that some of them may be interchanged without materially affecting the exposure cycle.

What is claimed is:

1. A reflex camera comprising:
   means for locating a film cassette having an exposure aperture in position for exposure of a film unit contained therein;
   means for initiating an exposure cycle;
   means for light shielding the film unit during viewing of a subject to be photographed, said light shielding means includes an opaque shade having an exposure aperture therein, said opaque shade being mounted closely adjacent said locating means for movement between a first position wherein it covers and prevents exposure of the film unit and a second position wherein said exposure aperture in said opaque shade is located in alignment with an exposure aperture in the film cassette, said movement into said second position being in response to actuation of said exposure initiating means;
   a pair of elongate rollers mounted adjacent said locating means, said rollers being mounted in position to receive the film unit therebetween as it is being advanced from its exposure position within the film cassette, following exposure, and spread a processing fluid across a photosensitive element of the film unit;
   means for driving at least one of said rollers; and
   means coupled to said driving means and said light shielding means for moving the shade from said second position to said first position as the exposed film unit is being advanced away from said exposure position by said rollers 2. A reflex camera as defined in claim 1 further including means for disengaging said coupling means from said driving means, and said light shielding means includes means for resiliently biasing said opaque shade into said second position, said biasing means having a force less than the force of the resistance of said driving means whereby said biasing means moves said opaque shade into said second position when said disengaging means is actuated to disengage said coupling means from said drive means.

3. A reflex camera as defined in claim 2 wherein said driving means charges said biasing means as said opaque shade is moved from said second position to said first position.

4. A reflex camera as defined in claim 2 wherein said light shielding means includes first and second rollers to which opposite ends of said opaque shade are attached, the major portion of said opaque shade including said exposure aperture being wound upon said second roller when said opaque shade is in said first position and the portion of said opaque shade having said exposure aperture therein being located intermediate said first and second roller when said light shielding means is in said second position.

* * * * *